(12) United States Patent
Yokawa

(10) Patent No.: US 8,094,243 B2
(45) Date of Patent: Jan. 10, 2012

(54) LCD TELEVISION WITH INTEGRATED STAND AND WALL MOUNT

(75) Inventor: Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1556 days.

(21) Appl. No.: 11/500,760

(22) Filed: Aug. 7, 2006

(65) Prior Publication Data

US 2007/0046840 A1 Mar. 1, 2007

(30) Foreign Application Priority Data

Aug. 25, 2005 (JP) .............................. 2005-006952 U

(51) Int. Cl.
*H04N 7/18* (2006.01)
(52) U.S. Cl. ........................................ 348/794; 348/843
(58) Field of Classification Search ................. 248/27.1, 248/276.1, 288.1, 291.1, 442.2; 348/794, 348/836–843
See application file for complete search history.

(56) References Cited

U.S. PATENT DOCUMENTS

| 2002/0130981 | A1* | 9/2002 | Ma et al. ........................ | 348/843 |
| 2004/0155166 | A1 | 8/2004 | Kim | |
| 2006/0221261 | A1* | 10/2006 | Ogawa et al. ................. | 348/794 |

FOREIGN PATENT DOCUMENTS

| EP | 1318445 | A | 6/2003 |
| EP | 1617314 | A2 | 1/2006 |
| JP | 05-4131 | | 1/1993 |
| JP | H09-274444 | A | 10/1997 |
| JP | 11-282366 | | 10/1999 |
| JP | 2003-15542 | | 1/2003 |
| JP | 2004-118191 | | 4/2004 |
| JP | 2004-126456 | | 4/2004 |
| JP | 3599332 | | 12/2004 |
| JP | 3109372 | U | 3/2005 |
| JP | 2006-030672 | | 2/2006 |
| JP | 2006-064786 | | 3/2006 |

OTHER PUBLICATIONS

Patents Act 1977: Search Report under Section 17(5) dated Nov. 2, 2006, searched on Nov. 1, 2006.

* cited by examiner

*Primary Examiner* — Andy Rao
(74) *Attorney, Agent, or Firm* — Yokoi & Co., U.S.A., Inc.; Toshiyuki Yokoi

(57) ABSTRACT

The present invention is intended to enable a body of an LCD television to stand upright even when a rear cabinet is removed, to enable the body alone to be used as a wall-hanging television without removing the rear cabinet, and to eliminate or reduce the screws for fixing a support bracket to a body-side bracket. The body-side bracket comprises a lower holding portion that causes both horizontal edges of the support bracket to be inserted upward and retains the support bracket slidably, an upper holding portion that causes an upper edge of the support bracket to be inserted upward and retains the support bracket slidably, and a stopper portion to constrain upward movements of the support bracket inserted in a bracket insertion slot from underneath and slides the support bracket upward to insert in the upper holding portion for fixing.

11 Claims, 17 Drawing Sheets

FIG. 7
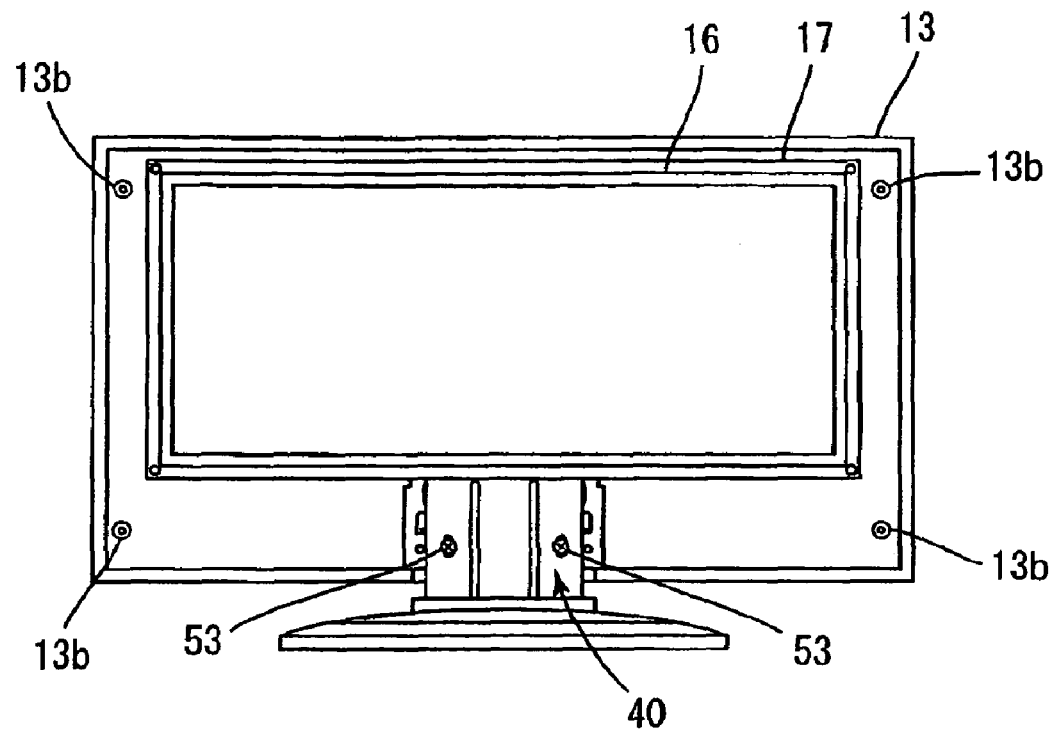
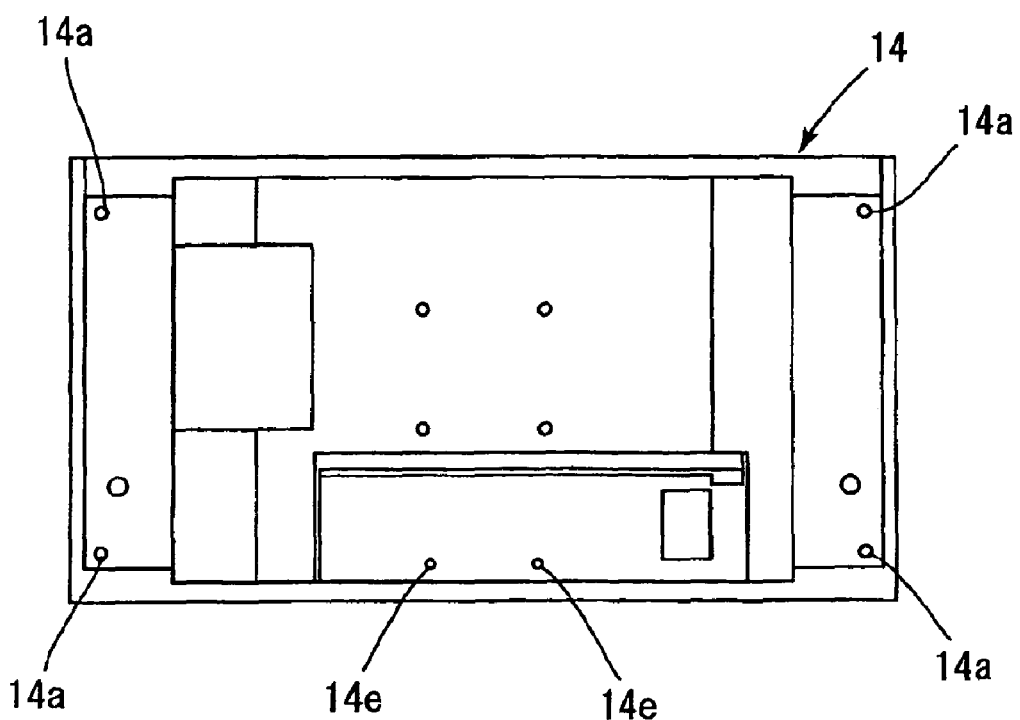

FRONT ←→ REAR

FIG. 16
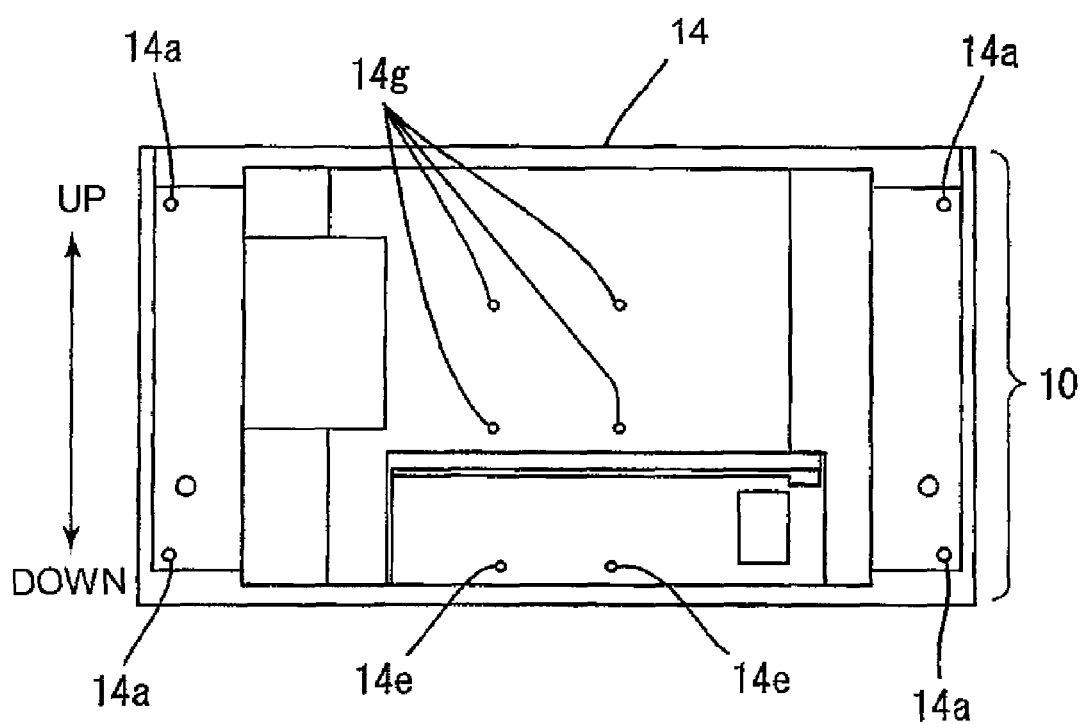
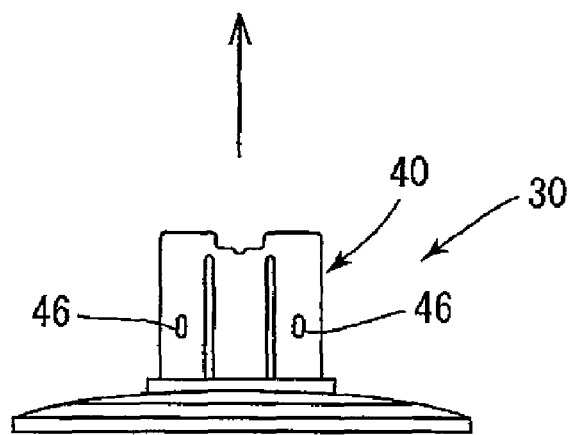

LCD TELEVISION WITH INTEGRATED STAND AND WALL MOUNT

CROSS-REFERENCES TO RELATED APPLICATIONS

The present application is related to the Japanese Utility Model Application No. 2005-6952, filed Aug. 25, 2005, the entire disclosure of which is expressly incorporated by reference herein.

BACKGROUND OF THE INVENTION (1) Field of the Invention

The present invention relates to an LCD television having a stand that supports the body of the LCD television from underneath via a body-side bracket, by extending a support bracket fixed to the body-side bracket.

(2) Description of Related Art

The LCD television disclosed in Japanese Patent Laid-open Publication (JP-A) No. 15542/2003 requires that the stand be detached to remove the rear case, making it impossible to stand the LCD television upright with the rear case removed.

With the plasma display apparatus disclosed in JP-A No. 126456/2004, it is necessary to detach the stand unit to remove the back cover, making it impossible to stand the plasma display apparatus upright with the back cover removed.

Japanese Patent Application No. 3599332 discloses an LCD display unit that stands upright with its back cabinet removed. In this document, an LCD display unit is described that comprises: a display unit having an LCD panel at the front; a display section including a front cabinet having a display window for the LCD panel and a back cabinet, and containing the display unit; and a stand that supports the display section, wherein: an extended mounting bracket is provided at a lower portion of the display unit; a support bracket is equipped to fix the stand to the mounting bracket; the support bracket and the mounting bracket are fixed by means of fixing screws, with the support bracket at back and the mounting bracket in front; at least the mounting bracket is covered with the back cabinet; and an opening is formed in the back cabinet to allow the above-described fixing members to pass through the back cabinet.

As illustrated in FIG. 4 of the above document, both sides of the metallic support bracket are bent to form a pair of flanges, and both sides of the mounting bracket are bent to form a pair of guide rails integrally with the mounting bracket, and the vertical positioning is made by bringing an upper end of the support bracket in contact with a raised portion of the bracket.

According to the art described in Japanese Patent Application No. 3599332, the pair of guide rails on the mounting bracket simply constrains the support bracket so that it will not move left or right. Therefore, the support bracket is designed to be easily disengaged backward from the pair of guide rails.

Also, the raised portion of the mounting bracket simply constrains the support bracket so that it will not move upward. Therefore, the support bracket is designed to easily come off backward from the raised portion Accordingly, it is necessary to fix the support bracket to the mounting bracket with four or more fixing screws. Because, if the fixing screws are removed, the support bracket comes off, toward the back, the pair of guide rails on the mounting bracket and the raised portion. This results in the following problems:

(A) It is impossible to detach the stand by removing the fixing screws with the LCD display unit standing upright. As a result, it is necessary to lay the LCD display unit sideways and remove the fixing screws to detach the stand, when using the LCD display unit as a wall-hanging display unit.

(B) Since many, four or more, fixing screw are required to fix together the support bracket and mounting bracket, material cost becomes high in manufacturing the LCD display unit, and also assembling the support bracket and mounting bracket requires much labor, resulting in high manufacturing cost of the LCD display unit.

(C) Since the support bracket is guided by the guide rails, a slight deformation of the support bracket or mounting bracket may increase friction resistance excessively, making it impossible to insert the support bracket in the mounting bracket.

The art described in Japanese Utility Model Publication No. 4143/1993 is for personal computers, and cannot be applied to LCD televisions. In this art, since a connector projects downward from the lower surface of a display unit, a good appearance may not be obtained when the display unit is hung on a wall, and also the display unit does not stand upright by itself.

SUMMARY OF THE INVENTION

The present invention discloses an LCD television wherein it is possible to stand a body upright by supporting it with a stand even when a rear cabinet is removed, and the stand can be detached to enable the body to be hung on a wall or to make the body alone stand upright, and it is also possible to use no or fewer screws to fix a support bracket to a body-side bracket, thereby reducing the manufacturing cost.

One aspect of the present invention provides an LCD television that comprises: a body having a cabinet that is composed of a front cabinet having an LCD panel formed at its front as a display window and a rear cabinet to be mounted at the back of the front cabinet; a body-side bracket attached to the body; and a stand that supports the body from underneath via the body-side bracket by extending upward a support bracket to be fixed to the body-side bracket, wherein: the support bracket is formed in the shape of plate; a bracket insertion slot is formed on the underside of the cabinet to insert the support bracket upward between the front cabinet and rear cabinet; the body-side bracket comprises a lower holding portion that retains the support bracket slidably up and down, with both horizontal edges of the support bracket inserted upward; an upper holding portion that retains the support bracket with its upper edge portion inserted upward; and a stopper portion to constrain upward movements of the support bracket inserted in the upper holding portion, and is mounted on the front cabinet above the bracket insertion slot and fixed by inserting the support bracket, which has been inserted in the bracket insertion slot from underneath, in the lower holding portion from underneath and sliding the support bracket up and down to insert it in the upper holding portion.

Another aspect of the present invention provides a bracket insertion slot may be formed on the underside of the front cabinet.

When the support bracket is inserted upward in the bracket insertion slot from underneath with the rear cabinet mounted to the front cabinet, the both horizontal edges of the support bracket are inserted upward in the lower holding portion from underneath, and then the upper edge of the support bracket is inserted upward in the upper holding portion from underneath, upward movements of the upper edge of the support bracket are constrained by the stopper portion. At this time, both horizontal edges of the support bracket are retained at the lower holding portion and the upper edge of the support bracket is retained at the upper holding portion. As a result, the support bracket is fixed to the body-side bracket and the body is supported from underneath by the stand via the body-side bracket.

Here, the support bracket is fixed to the body-side bracket without using screws, and therefore when the LCD television is lifted with it standing upright, the support bracket comes off downward by itself and the stand is detached. This makes it possible to detach the stand easily and use the LCD television as a wall-hanging television without removing the rear cabinet. Also, since the support bracket is inserted in a body side bracket insertion slot, no downward projections from the bottom of the body are necessary. This allows the body alone to stand upright without the stand.

Since the support bracket is mounted on the front cabinet, it is needless to say that the body stands upright supported by the stand even if the rear cabinet is removed, thereby improving the convenience in developing LCD televisions.

Furthermore, since it is not necessary to use many screws for fixing the support bracket to the body-side bracket, it is possible to eliminate or reduce fixing screws and bosses, reduce the material cost for manufacturing LCD televisions, and ease the work for assembling the support bracket and the body-side bracket, thereby reducing the manufacturing cost of LCD televisions.

Also, since the support bracket is retained by both the lower holding portion and the upper holding portion, some distortions in the support bracket and/or body-side will not prevent the support bracket from being inserted in the body-side bracket for fixing.

According to an aspect of the present invention, it is possible to stand the body upright even when the rear cabinet is removed, use the body as a wall-hanging television or stand the body alone upright by detaching the stand without removing the rear cabinet, and eliminate or reduce the screws for fixing the support bracket to the body-side bracket and thereby to reduce the manufacturing cost. Also, it is possible to fix the body-side bracket while securely retaining and positioning the support bracket by the upper holding portion, and thereby to support the body with the stand in a more stable condition. Since the body tilts, improved convenience can be achieved.

According to another aspect of the present invention, it is possible to stand the body upright even when the rear cabinet is removed, detach the stand without removing the rear cabinet to use the body as a wall-hanging television or stand the body alone upright, and also eliminate or reduce the screws for fixing the support bracket to the body-side bracket to reduce the manufacturing cost.

According to an optional aspect of the present invention, the support bracket can be securely retained by the lower holding portion and fixed to the body-side bracket.

According to another optional aspect of the present invention, the support bracket can be fixed to the body-side bracket while securely retaining and positioning the support bracket with the upper holding portion.

According to another optional aspect of the present invention, the support bracket can be fixed to the body-side bracket while more securely retaining and positioning the support bracket with the upper holding portion.

According to another optional aspect of the present invention, the body-side bracket is firmly fixed and therefore it is possible to fix the support bracket while more securely retaining and positioning the support bracket with the lower holding portion and the upper holding portion.

According to another optional aspect of the present invention, the support bracket is firmly fixed and therefore the body can be supported by the stand in more stable condition.

According to another optional aspect of the present invention, it is possible to fix the body-side bracket while more securely retaining and positioning the support bracket with the upper holding portion.

According to another optional aspect of the present invention, the body tilts and therefore improved convenience can be achieved.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 7 is an exemplary illustration of a rear view of the body showing how to mount a rear cabinet to the front cabinet;

FIG. 16 is an exemplary illustration of a rear view of the body from which the stand has been detached.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
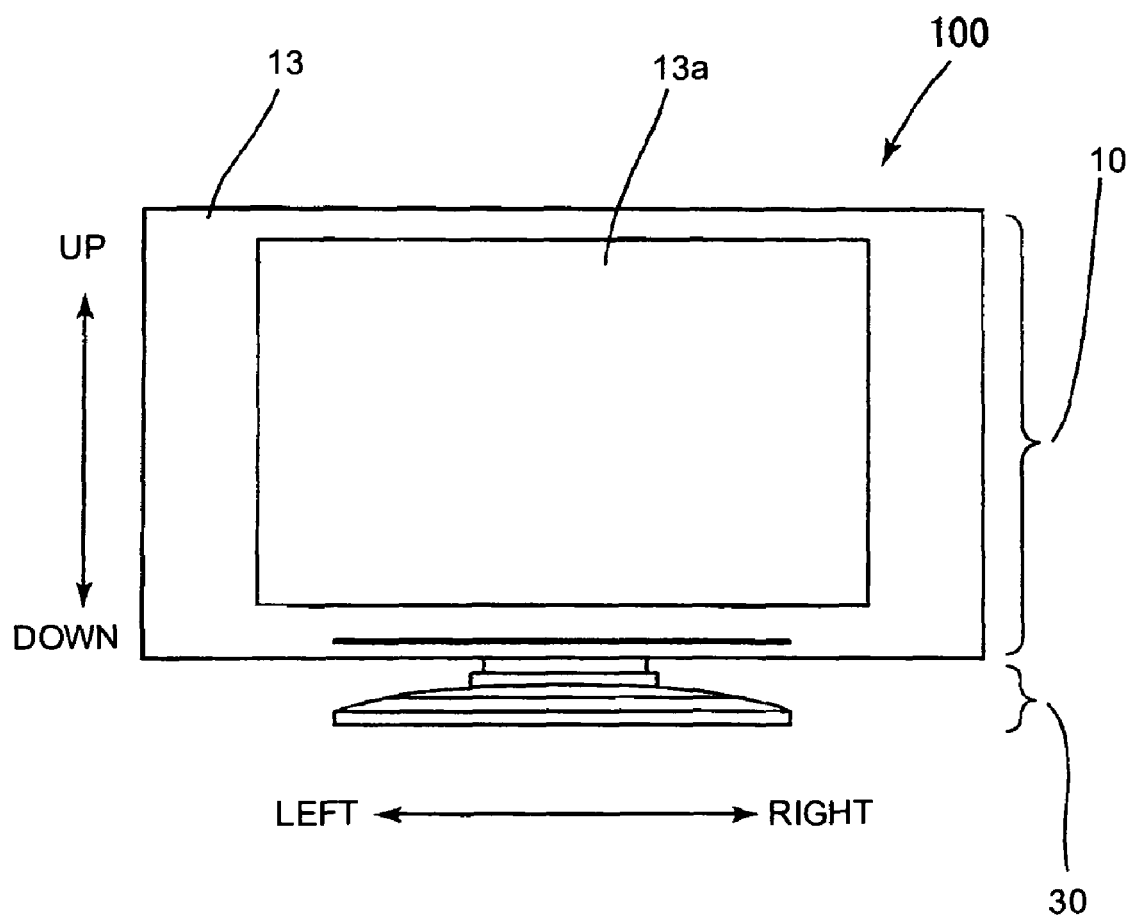
FIG. 1 is an exemplary illustration of a front view of an LCD television.
Figure 2:
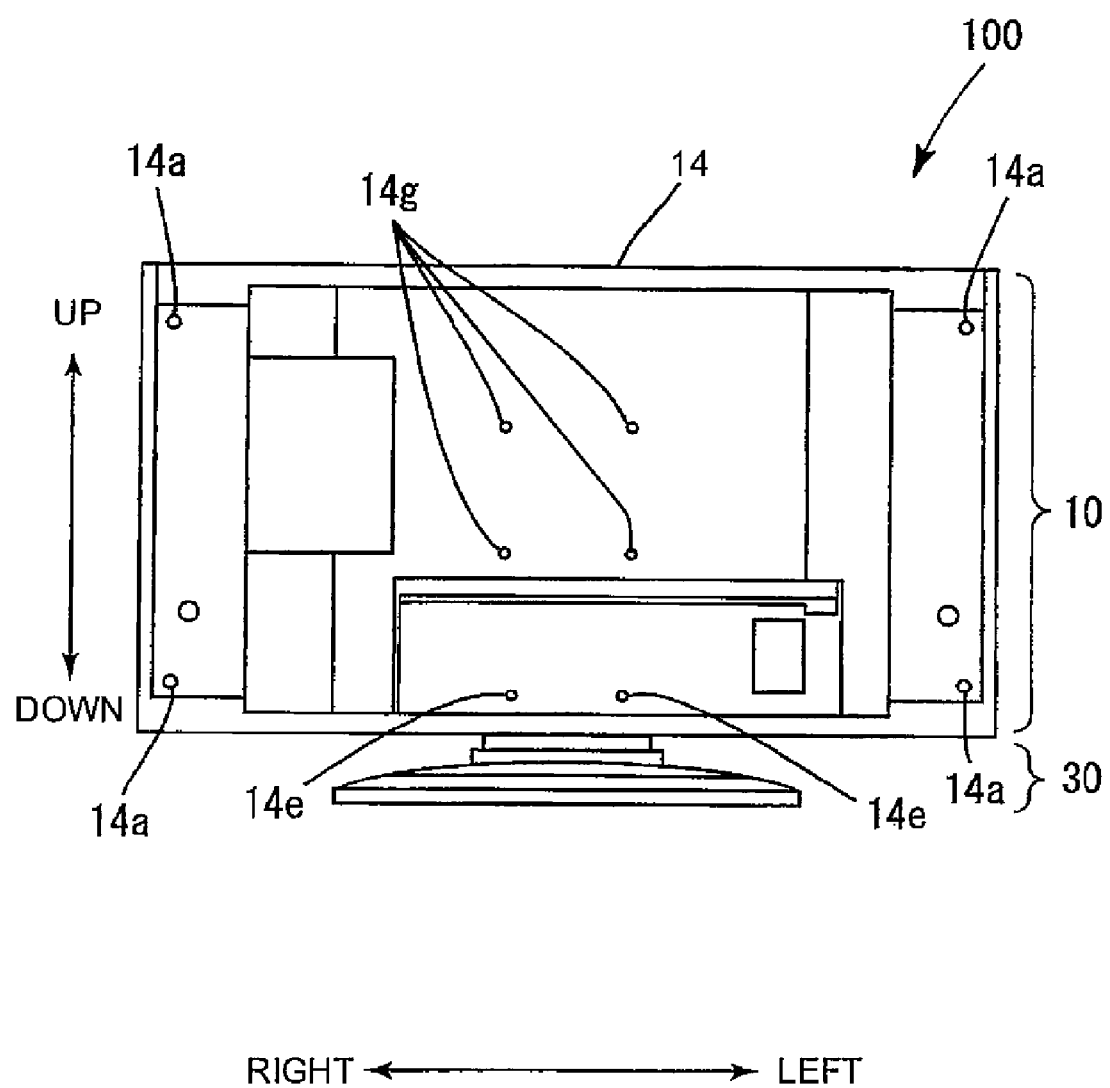
FIG. 2 is an exemplary illustration of a rear view of the LCD television.
Figure 3:
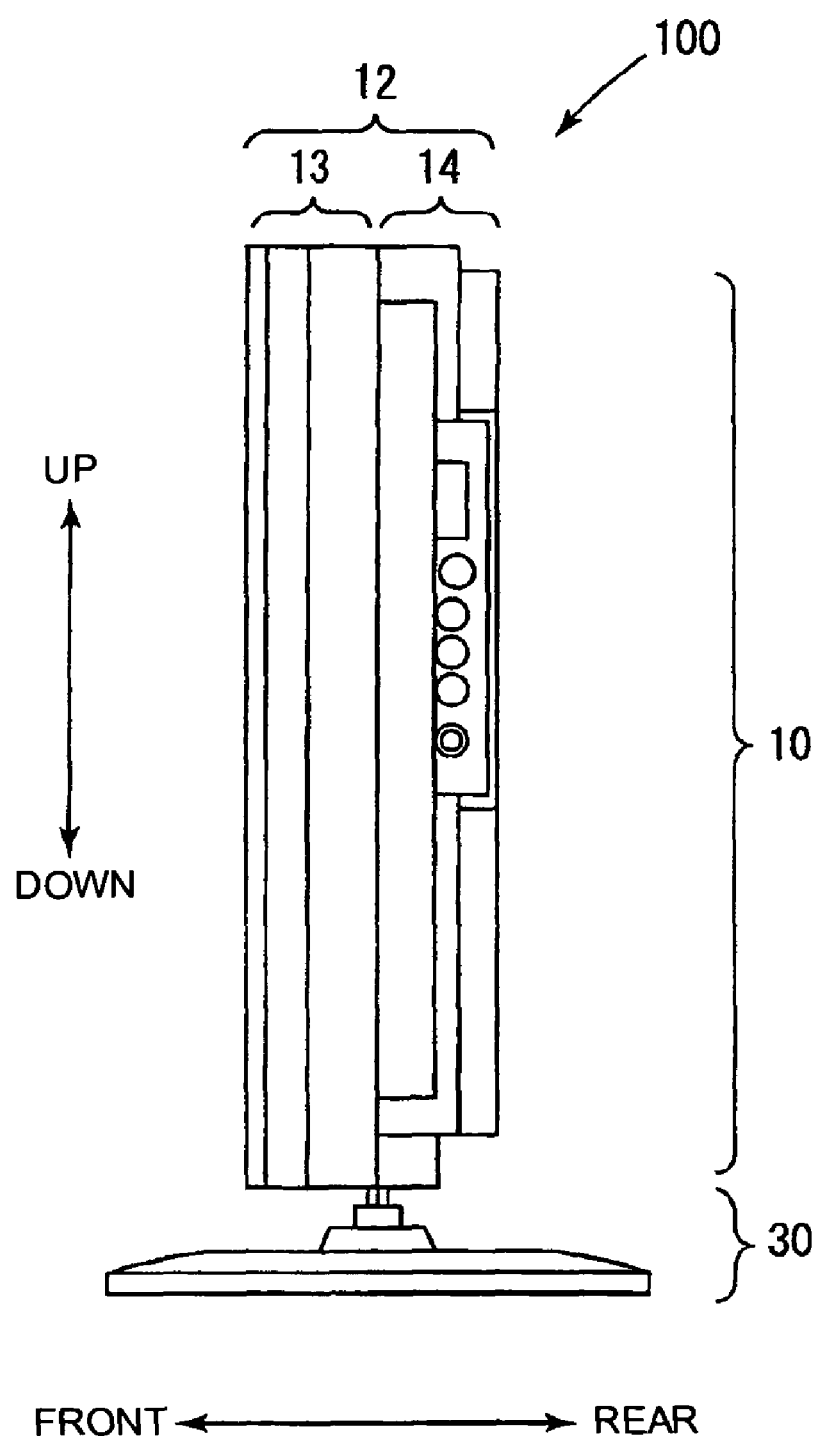
FIG. 3 is an exemplary illustration of a right side view of the LCD television.
Figure 4:
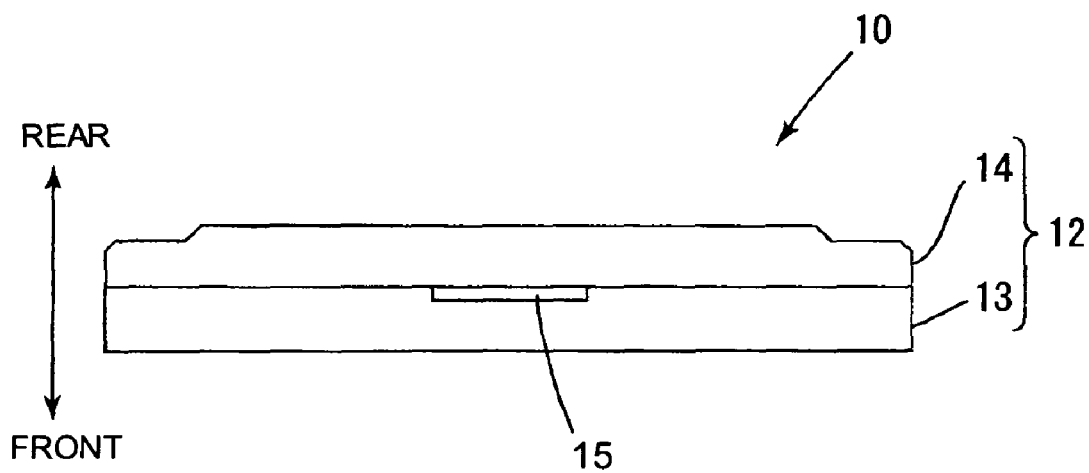
FIG. 4 is an exemplary illustration of a bottom view of the body of the LCD television.
Figure 5:
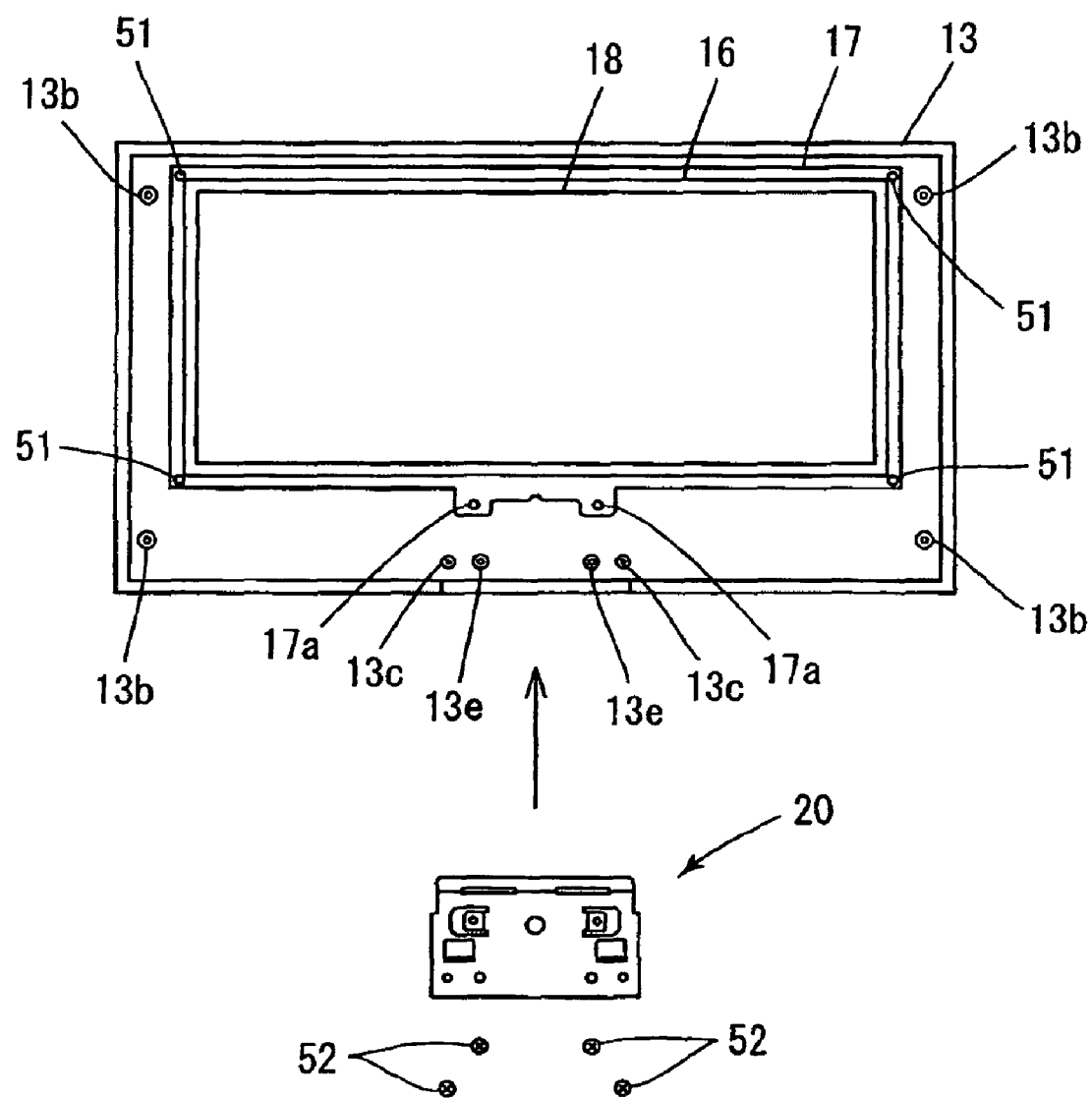
FIG. 5 is an exemplary illustration of a rear view of the body showing how to mount a body-side bracket on the rear side of a front cabinet of the LCD television.
Figure 6:
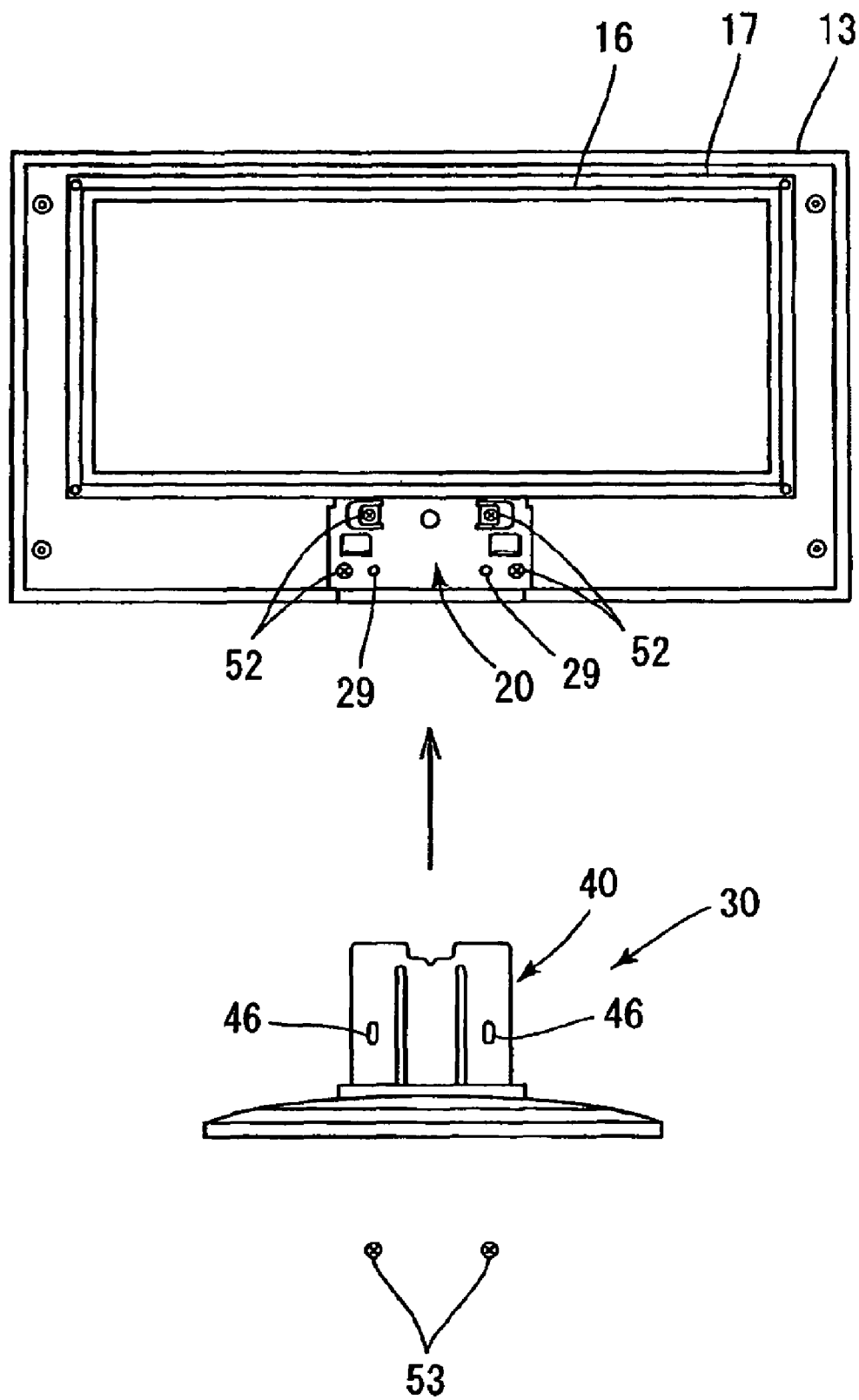
FIG. 6 is an exemplary illustration of a rear view of the body showing how to mount a support bracket on the body-side bracket mounted to the front cabinet.
Figure 8:
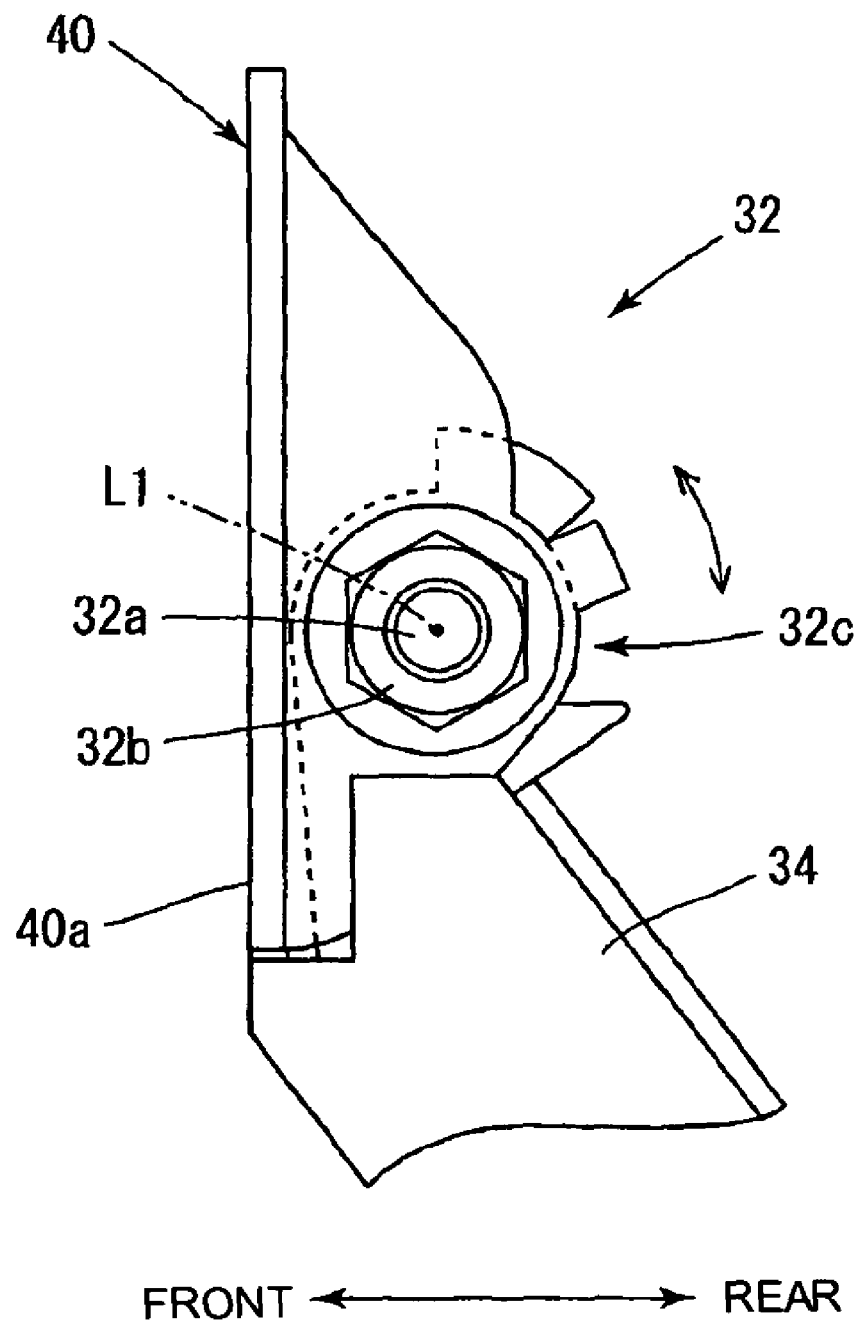
FIG. 8 is an exemplary illustration of a partially perspective right side view of a stand illustrating its substantial part, a tilt mechanism.
Figure 9:
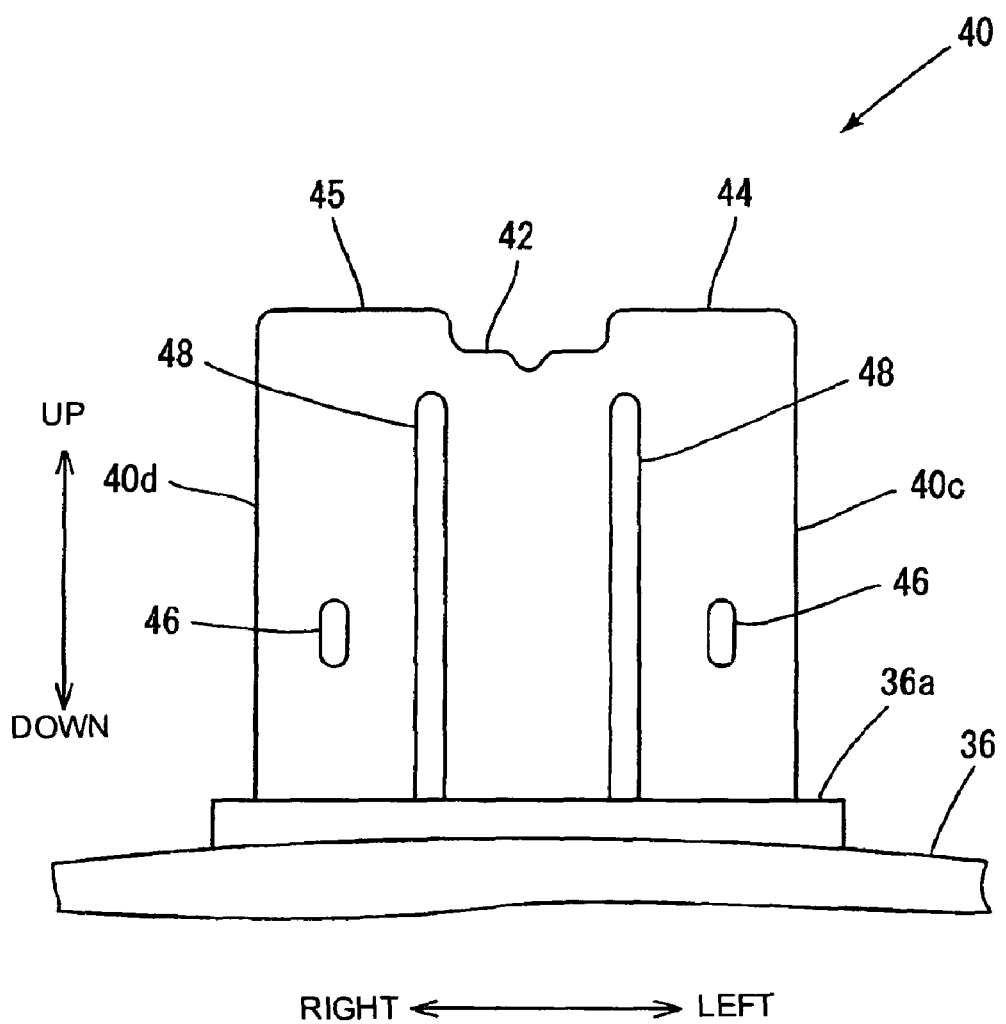
FIG. 9 is an exemplary illustration of a rear view of the support bracket.
Figure 10:
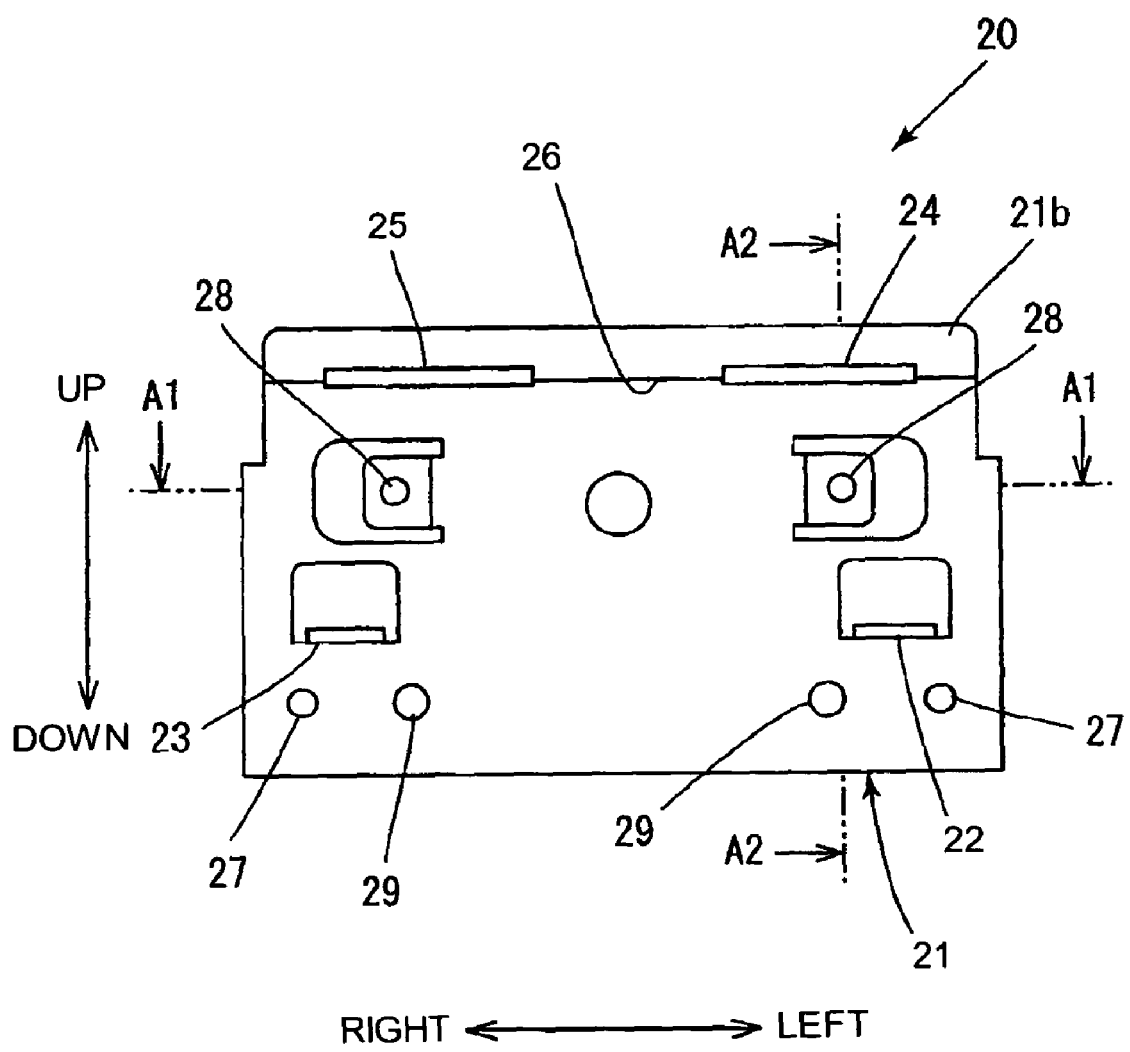
FIG. 10 is an exemplary illustration of a front view of the body-side bracket.
Figure 11:
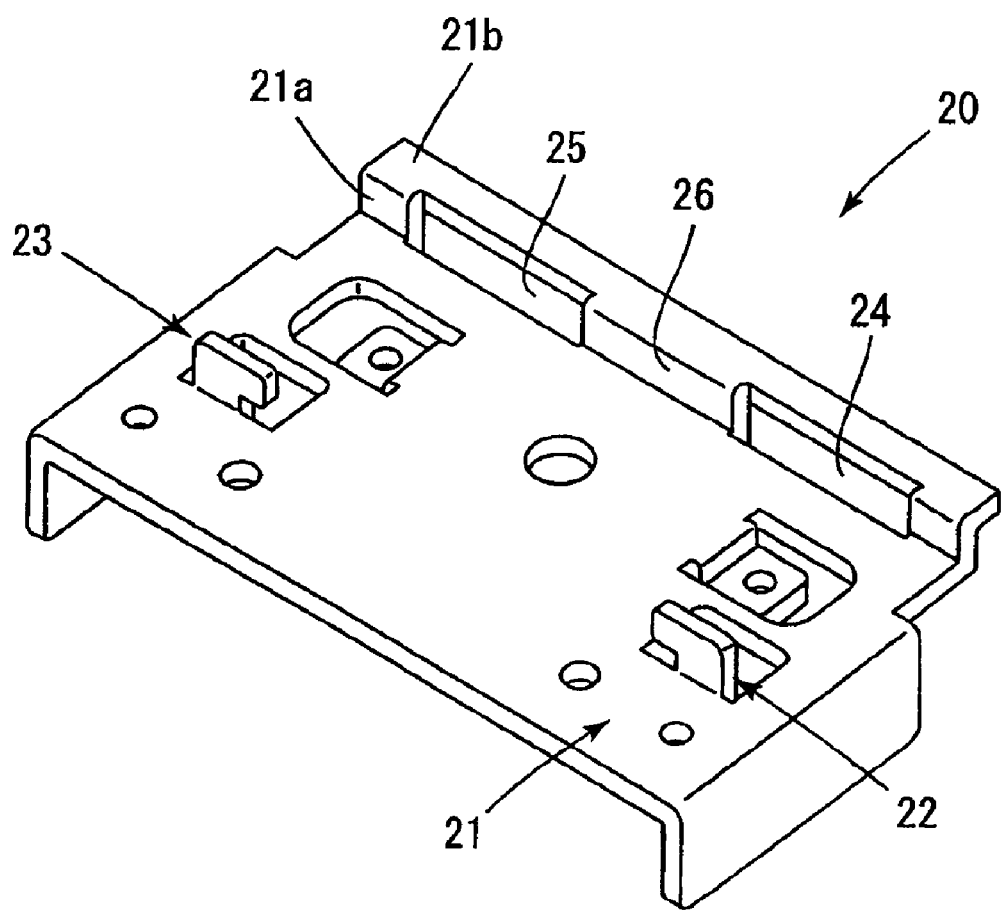
FIG. 11 is an exemplary illustration of a perspective external view of the body-side bracket.
Figure 12:
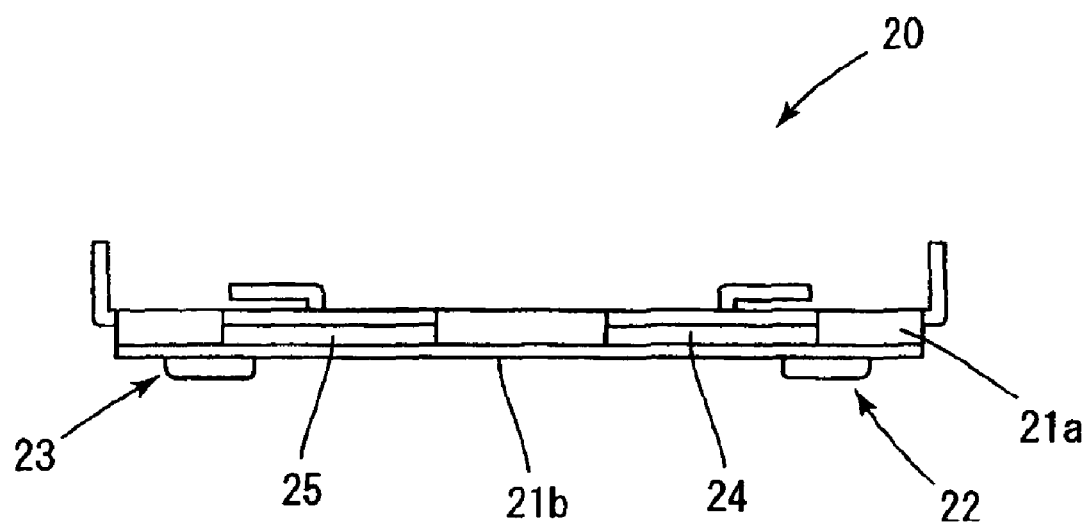
FIG. 12 is an exemplary illustration of a top plan view of the body-side bracket.
Figure 13:
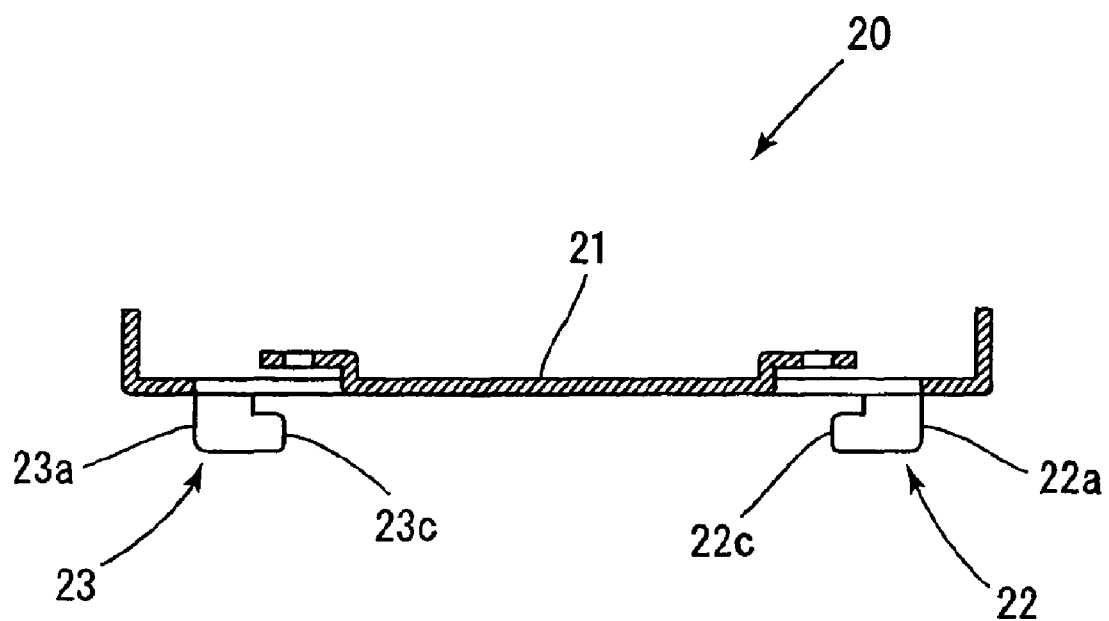
FIG. 13 is an exemplary illustration of a horizontal sectional view of the body-side bracket, taken along line A1-A1 in FIG. 10.
Figure 14:
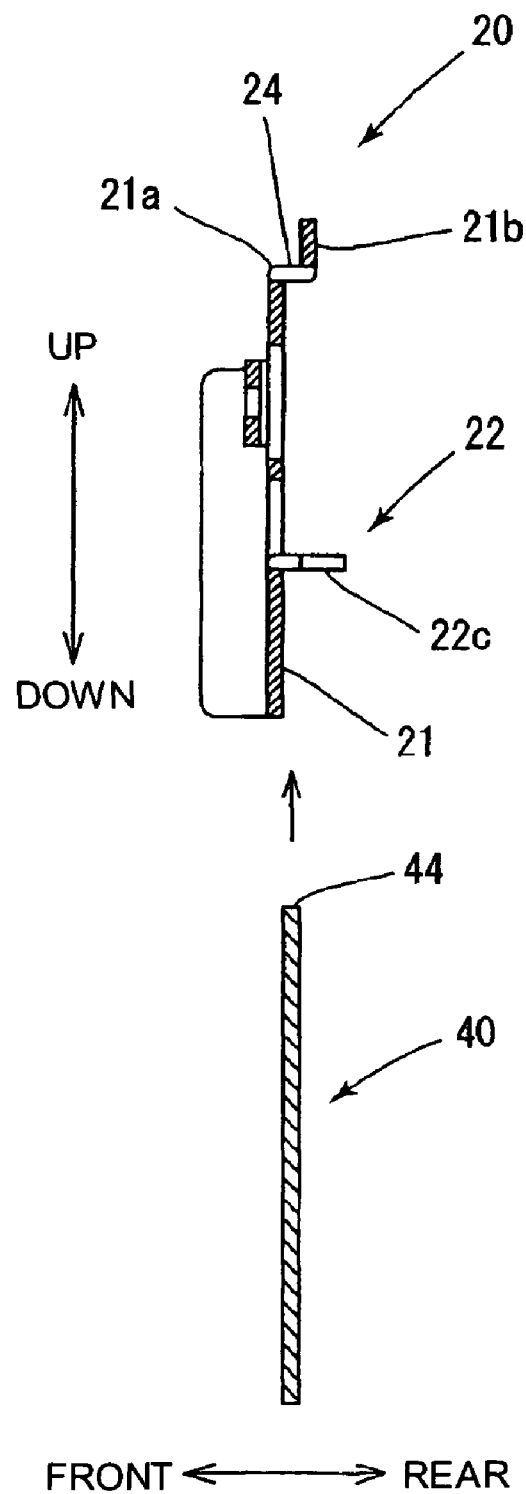
FIG. 14 is an exemplary illustration of a vertical sectional view of the body-side bracket, taken along line A2-A2 in FIG. 10.
Figure 15:
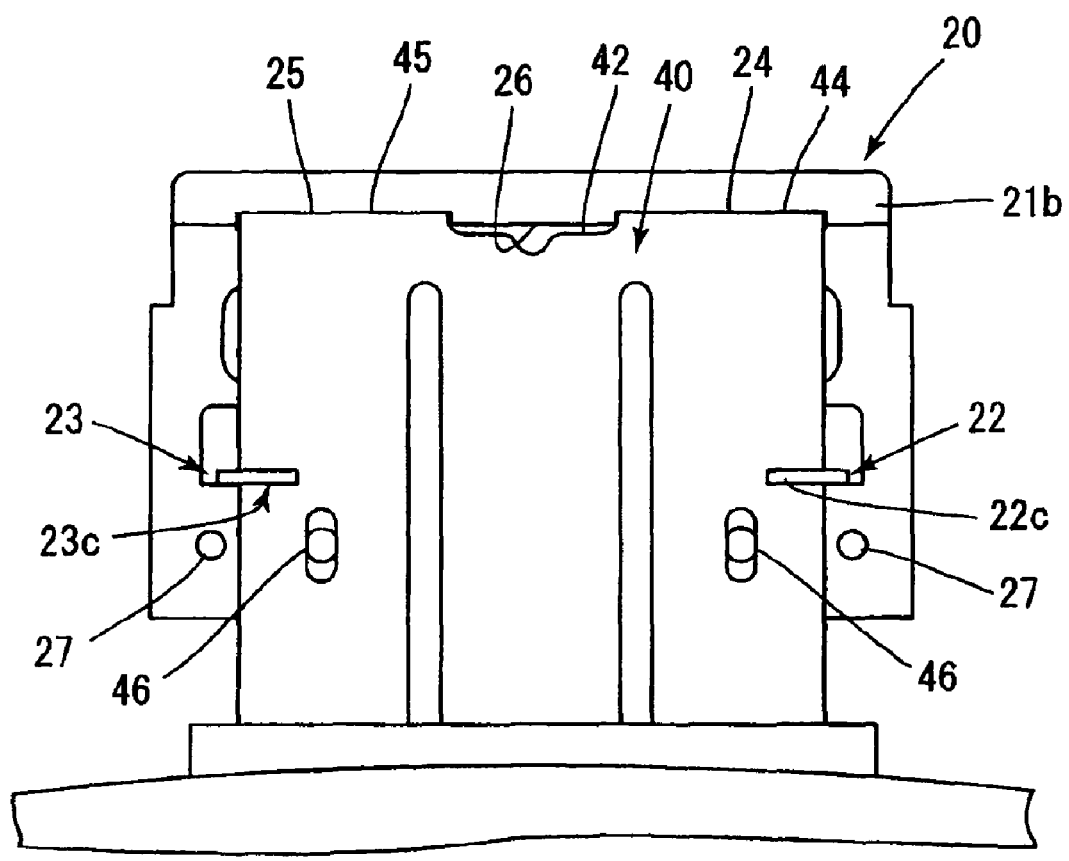
FIG. 15 is an exemplary illustration of a rear view of the body-side bracket to which the support bracket has been fixed.

The embodiments of the present invention are described below in the following order:

(1) Description of an LCD television
(2) Advantages of the LCD television
(3) Modifications
(1) Description of an LCD Television:

FIG. 1 is a front view of an LCD television (hereinafter referred to as TV) 100 according to an embodiment of the present invention, FIG. 2 is a rear view of the TV, FIG. 3 is a right side view of the TV, FIG. 4 is a bottom view of a body 10 of the TV, FIGS. 5 through 7 are views illustrating how to assemble the TV, seen from the rear side of the TV, FIG. 8 is a partially perspective right side view of a stand 30 illustrating its substantial part, a tilt mechanism 32, FIG. 9 is a rear view of a support bracket 40, FIG. 10 is a front view of a body-side bracket 20, FIG. 11 is a perspective external view of the body-side bracket, FIG. 12 is a top plan view of the body-side bracket, FIG. 13 is a horizontal sectional view of the body-side bracket, taken along line A1-A1 in FIG. 10, FIG. 14 is a vertical sectional view of the body-side bracket, taken along line A2-A2 in FIG. 10, FIG. 15 is a rear view of the body-side bracket 20 to which the support bracket 40 has been fixed, and FIG. 16 is a rear view of the body 10 from which the stand 30 has been detached. Note that the up, down, left, and right used in the descriptions below are relative to FIG. 1.

First, the TV 100 is briefly described.

The TV 100 roughly comprises a body 10, a body-side metallic bracket 20 mounted on the body, and a stand 30 that supports the body 10 from underneath via the body-side bracket. The body 10 comprises an approximately box-typed thin cabinet 12, an LCD panel 16 contained in the cabinet 12 with its picture displaying LCD display surface facing forward, a metallic panel support plate 17 that is attached to a front cabinet 13 in the cabinet 12 to support the LCD panel 16, a printed circuit board 18 on which a control circuit is formed, a receiver section (not shown) to receive broadcast signals, and an audio output section (not shown) to output voices. The panel support plate 17 is a frame member produced by press-forming a metal plate, having a pair of through holes 17a for screws arranged from side to side on a lower portion, and is fixed to an inner surface of the front of the front cabinet 13 with plural screws 51. The control circuit causes broadcast signals to be received and signals in a predetermined format to be input from an external input terminal, and thereby displays pictures on the LCD display surface and outputs voices from the audio output section.

The cabinet 12 comprises the front cabinet 13 made of plastic and having a display window 13a of the LCD panel 16 formed at the front, and a rear cabinet 14 made of plastic and to be mounted on the back of the front cabinet. The front cabinet 13 has four cabinet-mounting bosses 13b, four panel support-mounting bosses for fixing the panel support plate, and the like, all of them projecting backward, and is integrally formed by injection molding of thermoplastic resin or the like. The rear cabinet 14 has four cabinet fixing holes 14a, four wall-hanging screw holes 14g, and the like, formed on its back, and is integrally formed by injection molding of thermoplastic resin or the like.

The stand 30 supports the body 10 from underneath via the body-side bracket 20, by extending upward the metallic support bracket 40 to be fixed to the body-side bracket 20. The support bracket 40 is a plate-like member integrally formed by press-forming a metal plate.

At the bottom of the cabinet 12, a bracket insertion slot 15 is formed, through which the support bracket 40 is inserted upward between the front cabinet 13 and rear cabinet 14. This bracket insertion slot is formed between the front cabinet and rear cabinet by cutting off a portion of the front cabinet.

As shown in FIGS. 10 through 14, the body-side bracket 20 has L-shaped lower holding portions 22 and 23 that retain both horizontal edges 40c and 40d of the support bracket 40 slidably up and down, by inserting the both edges upward, upper holding portions 24 and 25 that retain an upper edge of the support bracket 40, and a stopper portion 26 to constrain upward movements of the support bracket 40 inserted in the upper holding portion. The body-side bracket 20 is integrally formed by press-molding a metal plate. The body-side bracket 20 is attached to the front cabinet 13 above the bracket insertion slot 15. Also, the body-side bracket is fixed by inserting the support bracket 40, which has been inserted in the bracket insertion slot 15 from underneath, in the lower holding portions 22 and 23 from underneath and sliding upward to insert in the upper holding portions 24 and 25.

When the support bracket 40 is inserted upward in the bracket insertion slot 15 from underneath with the rear cabinet 14 mounted on the front cabinet 13, both horizontal edges 40c and 40d of the support bracket 40 are inserted upward in the lower holding portions 22 and 23 of the body-side bracket 20 from underneath, and the upper edge of the support bracket 40 is inserted upward in the upper holding portions 24 and 25 from underneath, upward movements of the upper edge of the support bracket 40 is constrained by the stopper portion 26. At this time, both horizontal edges 40c and 40d of the support bracket 40 are retained at the lower holding portions 22 and 23, and the upper edge of the support bracket 40 is retained at the upper holding portions 24 and 25. This causes the support bracket 40 to be fixed to the body-side bracket 20, and the body to be supported by the stand 30 from underneath via the body-side bracket 20.

Here, as shown in FIG. 15, the support bracket 40 is fixed to the body-side bracket 20 without using screws, and therefore, when the body 10 is lifted with the TV 100 standing upright, the support bracket 40 comes off downward by itself and the stand 30 is detached. This makes it possible to detach the stand 30 easily without removing the rear cabinet 14 and to use the LCD television as a wall hanging television. Further, since the support bracket 40 is inserted in the bracket insertion slot 15 of the body, a downward projection from the bottom of the body is not necessary. Therefore, it is possible to stand the body alone upright without the stand 30.

Needless to say, since the support bracket 40 is mounted on the front cabinet 13, the body stands upright with the support of the stand 30 even when the rear cabinet 14 is removed, thus improving the convenience in development of LCD televisions.

Moreover, since it is possible to eliminate or reduce the screws or bosses for fixing the support bracket 40 to the body-side bracket 20, material cost in manufacturing LCD televisions can be reduced and also the work for assembling the support bracket 40 with the body-side bracket 20 can be eased, making it possible to reduce the cost of manufacturing LCD televisions.

Next, the TV 100 is described in detail.

As shown in FIG. 8, the stand 30 has a tilt mechanism 32 that causes the support bracket 40 to tilt left and right about a predetermined rotation axis L1 with respect to a metallic stand base 34 fixed by a base cover 36. This tilt mechanism has a rotation constraining mechanism 32c that constrains the range of tilt rotation of the bolt 32a, nut 32b, washer (not shown) to be fitted on the bolt, and support bracket 40 within a predetermined rotation, and also prevents the body 10 from tilting by itself by adjusting the degree of fastening the nut 32b on the bolt 32a. The tilt mechanism allows the support bracket 40 to tilt at the lower edge 40a about the rotation axis L1. As shown in FIG. 9, the support bracket 40 extends upward through a cover opening 36a formed on the top of the base cover 36.

This allows the body 10 to be tiltably supported by the stand 30 about the rotation axis L1, via the body-side bracket 20. Since this enables a user of an LCD television to retain the LCD display surface at a desired angle by tilting it, this LCD television is convenient.

In addition, the stand base is metallic and the TV 100 is grounded though the panel support plate 17, body-side bracket 20, support bracket 40, and stand base 34, and in this regard the TV 100 is of rational construction.

As shown in FIGS. 10 through 14, the body-side bracket 20 has at least a plate-like main portion 21, the lower holding portions 22 and 23, the upper holding portions 24 and 25, and the stopper portion 26. Also, the body-side bracket 20 has a bent extending portion 21a that is bent from the upper edge of the main portion 21 toward a surface (rear surface) where the support bracket 40 is fixed and extends backward, and also a second bent extend portion 21b that is bent upward from an end (rear end) of the bent extending portion 21a extending from the main portion 21 and extends upward. Here, the interval x1 between the rear of the main portion 21 (front side) and the front of the second bent extending portion 21b (rear side) is made to be slightly larger than the thickness t1 of the support bracket (for example, t1<x1<2×t1).

On the bent extending portion 21a, the upper holding portions 24 and 25 that are through holes for inserting the upper insertion portions 44 and 45 of the support bracket 40, and the stopper portion 26 for constraining upward movements of the support bracket inserted in the upper holding portions 24 and 25 that are through holes by hitting a stopper hitting portion 42 of the support bracket 40 against the bottom are formed. The second bent extending portion 21b brings the first and second upper insertion portions 44 and 45 in contact with the front opposite to the rear surface where the support bracket 40 is fixed.

The lower holding portions 22 and 23 each comprises the first lower holding portion 22 on the left side that causes the left edge 40c of the support bracket to be inserted upward to make it slidable up and down, and the second lower holding portion 23 on the right that causes the right edge 40d to be inserted upward to make it slidable up and down. The first and second lower holding portions 22 and 23 have lower holding bases 22a and 23a extending from the rear of the main portion 21 to which the support bracket 40 is fixed to the support bracket 40 side (rear side), and adjacent direction extending portions 22c and 23c that extend in directions adjacent to each other from the ends of the extending lower holding bases 22a and 23a and make the support bracket slidable up and down by sandwiching each of the horizontal edges 40c and 40d with the main portion 21. Here, the interval x2 between the inner end (right end) of the first lower holding base 22a and the inner end (left end) of the second lower holding base 23a is made to be slightly larger than the width t2 of the support bracket 40 (for example, t2<x2<1.05×t2). On the other hand, the interval x3 between the inner end (right end) of the first adjacent direction extending portion 22c and the inner end (left end) of the second adjacent direction extending portion 23c is made to be slightly larger than the width t2 of the support bracket (for example, 0.95t2<x3<t2). Also, the interval x4 between the rear of the main portion 21 (front side) and the front end of the adjacent direction extending portions 22c and 23c (rear side) is made to be slightly larger than the thickness t1 of the support bracket (for example t1<x4<2×t1).

The upper holding portion 24 and 25 as through holes comprise the first upper holding portion 24 and the second upper holding portion 25 that insert upward the first and second upper insertion portions 44 and 45 respectively and retain them so as to be slidable up and down. The upper holding portions 24 and 25 are formed at the outside of both horizontal edges of the stopper portion 26. Here, the horizontal length x5 of the upper holding portions 24, and 25 is made to be slightly larger than the horizontal length t3 of the upper insertion portions 44 and 45 of the support bracket (for example, t3<x5<2×t3). Also, the cross-directional thickness x6 of the upper holding portions 24 and 25 is made to be slightly larger than the cross-directional thickness t4 of the upper insertion portions 44 and 45 of the support bracket (for example, t4<x6<2×t4). Further, the upper holding portions 24 and 25 are arranged so that the upper insertion portions 44 and 45 of the support bracket are smoothly inserted.

As shown in FIG. 9, at the upper edge of the support bracket 40, the stopper hitting portion 42 that hits the stopper portion 26 of the body-side bracket 20 when slid upward at the rear surface of the body-side bracket 20, and the first insertion portion 44 and second insertion portion 45 that respectively extend from the horizontal edges 40c and 40d to above and beyond the stopper hitting portion and insert in the upper holding portions 24 and 25 of the body-side bracket 20 are formed. The upper insertion portions 44 and 45 are formed at areas where they are smoothly inserted in the upper holding portions 24 and 25 of the body-side bracket.

On the rear side of the support bracket 40, a pair of evaginated portions 48 are formed that evaginate backward from longitudinal direction to vertical direction. Thanks to this, if an attempt to insert a back-to-front support bracket 40 is prevented by the evaginated portions 48, thus preventing the stand 30 from being attached back-to-front to the body 10.

By providing the lower holding portion, upper holding portion, and stopper portion on the body-sided bracket 20, the support bracket 40 is positioned and fixed to the body-side bracket 20 without being screwed, and the body 10 is securely supported by the stand 30 via the body-side bracket 20. This eliminates or reduce the screws to fixing the support bracket to the body-side bracket.

As shown in FIG. 5, a pair of bosses 13c for screwing the body-side bracket 20 alone are integrally molded on the front cabinet 13. The bosses 13c are provided side by side and are projecting backward from the inner surface of the front of the front cabinet 13, below the panel support plate 17.

On the panel support plate 17 attached to the front cabinet 13, a pair of panel screwing through holes 17a are formed to screw the body-side bracket 20 alone.

On the body-side bracket 20, a pair of lower screwing through holes 27 corresponding to the screwing bosses 13c are formed, and a pair of upper screwing through holes 28 corresponding to the panel screwing through holes 17a. When a screw 52 is passed through the lower screwing through hole 27 to screw onto the screwing boss 13c, the body-side bracket is directly mounted and fixed to the front cabinet 13, and when the screw 52 is passed through the upper screwing through hole 28 to screw to the panel screwing through hole 17a, the body-side bracket is mounted and fixed to the panel support plate 17.

As described above, the body-side bracket 20 is screwed to the front cabinet 13 made of plastic at two points on the lower portion of the bracket, and screwed to the panel support plate made of robust metal at two points on the upper portion of the bracket. This allows the body-side bracket to be firmly fixed and the support bracket to be fixed to the body-side bracket while securely retaining the support bracket with the lower holding portion and upper holding portion for positioning.

Also, the front cabinet 13 has a pair of both-bracket fixing bosses 13e that are integrally molded at more inner side than the pair of screwing bosses 13c to screw only the body-side bracket 20. The both-bracket fixing bosses 13e are formed side by side and are projecting backward from the inner side of the front of a lower portion of the panel support plate 17.

On the body-side bracket 20, a pair of body-side lower screwing through holes 29 are formed that are integrally molded so as to align with the both-bracket fixing bosses 13e.

The support bracket 40 has a pair of vertically long oval-shaped stand-side lower screwing through holes 46, aligned with the both-bracket fixing bosses 13e.

On the other hand, as shown in FIGS. 2 and 7, the rear cabinet 14 has an integrally molded pair of both-brackets fixing holes 14e that enable the both bracket fixing bosses 13e and the body-side bracket 20 and support bracket 40 to be screwed together, by aligning the both-bracket fixing bosses 13e with the body-side lower screwing through holes 29 and stand-side lower screwing through holes 46. The both-brackets fixing holes 14e are cross directional through holes aligned with the both-bracket fixing bosses 13e.

As described above, the support bracket 40 is, after inserted in the body-side bracket 20 and positioned, fixed with screws to the body-side bracket 20 and the front cabinet 13 at the stand-side lower screwing through holes 46. This allows the support bracket to be securely fixed and the body to be supported with the stand in a more stable condition.

Now the assembling procedure for the TV 100 is described below.

First, the body-side bracket 20 is attached to the front cabinet 13 as illustrated in FIG. 5. Specifically, the body-side bracket 20 is placed at a predetermined mounting position, then screws 52 are passed through lower side screwing through holes 27 to fix to screwing bosses 13c and 13c and screws 52 are passed through upper side screwing through holes 28 to fix to the panel screwing through holes 17a. By this, a lower side of the support bracket 40 is directly mounted to the front cabinet 13 and an upper side is indirectly mounted and fixed to the front cabinet 13 via the metallic panel support plate 17. At this time the body-side lower screwing through holes 29 of the body-side bracket are aligned with the both-bracket fixing bosses 13e.

Next, the stand 30 having the support bracket is attached to the body-side bracket 20 mounted on the body 10, as shown in FIG. 6. Specifically, the support bracket 40 extending upward at the stand 30 is placed at a predetermined position, and screws 53 are passed through the stand-side lower screwing through holes 46 and the body-side lower screwing through holes 29 to fix to the both-bracket fixing bosses 13e. By this, a lower portion of the support bracket 40 is mounted and fixed to the front cabinet 13 via the body-side bracket 20. Here, since the stand-side lower screwing through holes 46 are formed in vertically-long oval shape, even if there are variations in the relative vertical positions of both brackets 20 and 40 that are positioned when the support bracket 40 is inserted upward in the body-side bracket 20 from underneath, it is possible to securely insert the support bracket in the both through holes 46 and 29 to fix to the boss 13e.

There is no need to screw both brackets 40 and 20 at this stage.

Then, the rear cabinet 14 is mounted to the front cabinet 13 as shown in FIG. 7. Specifically, the rear cabinet 14 is placed at a predetermined mounting position, and screws are inserted in a plurality of cabinet fixing holes 14a to fix to corresponding cabinet mounting bosses 13b. By this, the rear cabinet 14 is mounted to the front cabinet 13, completing the assembly of the TV 100. FIG. 2 shows this state.

If both brackets 46 and 29 have not been fixed together with screws, it is possible to screw them to the both-bracket fixing bosses 13e by inserting screws 53 from the both-brackets fixing holes 14e and pass them through the stand-side lower screwing through holes 46 and the body-side lower screwing through holes 29.

(2) Advantages of the LCD Television:

The lower holding portions 22 and 23 and the upper holding portions 24 and 25 for retaining the support bracket 40 constrain cross-directional movements as well as lateral movements of the support bracket. This prevents the support bracket 40 from coming off the body-side bracket backward even if both brackets 40 and 20 have not been screwed together. Since the support bracket 40 is fixed to the body-side bracket 20 without fastening with screws, as just described, it is possible to remove the support bracket 40 by turning the screws 53 from the both-brackets fixing holes 14e. When the TV 100 is lifted with it standing upright, the support bracket comes off downward by itself and the stand is detached. Thus, it is possible to remove the stand easily without removing the rear cabinet for using the LCD television as a wall-hanging television.

Moreover, since the support bracket is inserted in the body side bracket insertion slot, no downward projecting portions from the bottom of the body are needed. This makes it possible to stand the body upright without the stand.

Since the support bracket is mounted on the front cabinet, it is needless to say that the body stands upright with the support of the stand when the rear cabinet is removed, thus improving convenience in developing LCD televisions.

Also, there is no need to use many screws for fixing the support bracket to the body-side bracket, and therefore it is possible to eliminate or reduce the fixing screws and bosses. This reduces the material cost if manufacturing LCD televisions, and also eases the work for assembling the support bracket and the body-side bracket, thus reducing the manufacturing cost of LCD televisions.

Moreover, since the support bracket is retained by the lower holding portion and the upper holding portion, some distortions in the support bracket and/or body-side bracket will not prevent inserting the support bracket in the body-side bracket to fix.

(3) Modifications:

According to the present invention, various modifications are conceivable.

Although small to medium sized LCD televisions with 25 inch or less screen are preferable because such television are light and easy to tilt, medium to large sized ones may be applicable. Also, LCD televisions having integral video decks or DVD players are also applicable. The present invention is also applicable to LCD televisions equipped with a swivel mechanism and LCD televisions without a tilt mechanism.

The upper holding portions formed on the body-side bracket may be reduced to one, and also the upper insertion portion may be reduced to one. The stopper portion formed on the body-side bracket may be more than one, and also the stopper hitting portion formed on the support bracket may be more than one. For example, it is possible to form a single upper holding portion at a horizontal central portion of the upper side of the body-side bracket, and a stopper portion on both horizontal outsides of the upper holding portion, and form a single insertion portion at a horizontal central position on the upper edge of the support bracket and a stopper hitting portion on both horizontal outsides of the upper insertion portion.

The bracket insertion slot may be formed between front cabinet and rear cabinet by cutting off a portion of the rear cabinet.

Figure 17:
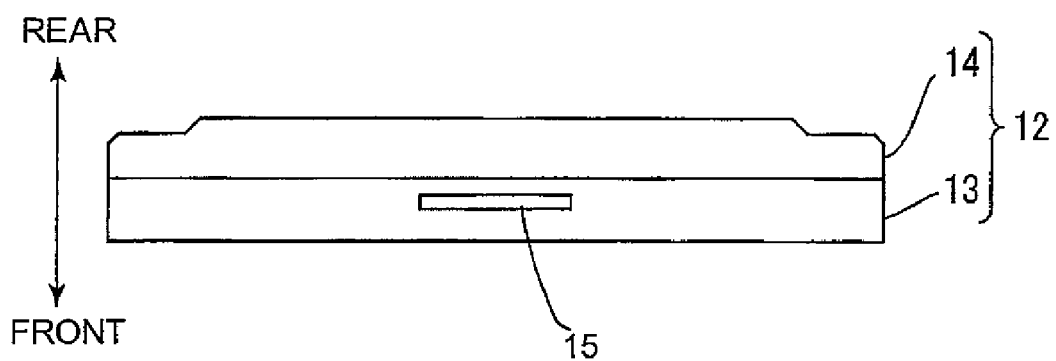
FIG. 17 is an exemplary illustration of a bottom view of the body in a modification.

Also, as shown in FIG. 17, a bracket insertion slot 15 may be formed at the bottom of the front cabinet 13 for inserting the support bracket 40 upward.

Even various modifications described above have the same advantages, namely, the body can stand upright with the stand even when the rear cabinet is removed, the body can be used as a wall-hanging television or can stand upright without removing the rear cabinet, and the manufacturing cost can be reduced by eliminating or reducing the screws for fixing the support bracket to the body-side bracket.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. An LCD television comprising:
a body having a cabinet that is composed of a plastic front cabinet with an LCD panel display window formed at its front, and a plastic rear cabinet to be mounted on the rear of the front cabinet;
a body-side bracket mounted on the body; and
a stand that supports the body from underneath via the body-side bracket by extending upward a support bracket to fixed to the body-side bracket,
wherein:
the support bracket is integrally molded in a plate form by press-forming a metal plate, and also can be tilted at a lower edge thereof about a predetermined rotation axis;
on a bottom of the cabinet, a bracket insertion slot is formed through which the support bracket is inserted upward between the front cabinet and the rear cabinet;
the body-side bracket is integrally molded by press-forming a metal plate;
the body-side bracket has at least: a plate-like main portion; first and second lower holding portions that retain vertically slidably both vertical edges of the support bracket by inserting upward; first and second upper holding portions that retain an upper edge of the support bracket by inserting it upward; and a stopper portion to constrain upward movements of the support bracket inserted in the first and second upper holding portions; and the body-side bracket is mounted to the front cabinet above the bracket insertion slot, and also is fixed by inserting the support bracket, which has been inserted in the bracket insertion slot from underneath, in the lower holding portion from underneath and sliding the support bracket upward so as to be inserted and fixed in the upper holding portion;
the first and second lower holding portions exist at a predetermined distance under the first and second upper holding portions;
at an upper edge of the support bracket, a stopper hitting portion that hits against the stopper portion when slid upward, first and second upper insertion portions that are each extend above the stopper hitting portion and that are inserted in the upper holding portion are formed;
the first and second lower holding portions have lower holding bases extending toward the support bracket from a surface of the main portion where the support bracket is fixed, and adjacent direction extending portions that extend from each edge of the extended lower holding bases in directions adjacent to each other and retain vertically slidably so as to sandwich each vertical edge of the support bracket between the main portion and the adjacent direction extending portion;
the body-side bracket has formed thereon: a bent extending portion having the upper holding portion that is bent and extended from an upper edge of the main portion toward a surface where the support bracket is fixed, and is a through hole for inserting upward an upper insertion portion of the support bracket; and the stopper portion that constrains upward movements of the support bracket inserted in the upper holding portion which is the through hole through which the stopper hitting portion of the support bracket is made to hit against a bottom; and
a second bent extending portion that causes the first and second upper insertion portions, which have been inserted in the first and the second upper holding portions that are the through holes upwardly bent and extending from an end of the bent extending portion extending from the main portion, to contact with a surface opposite to a surface on which the support bracket is fixed,
the front cabinet has a pair of both-bracket fixing bosses that are formed integrally side by side and projecting backward from an inner surface of the front cabinet;
the body-side bracket has a pair of body-side lower screwing through holes formed in alignment with the pair of both-bracket fixing bosses of the front cabinet;
the support bracket has a pair of stand-side lower screwing through holes formed in vertically-long oval shape, in alignment with the pair of both-bracket fixing bosses of the front cabinet; and
the rear cabinet has a pair of both-bracket fixing holes that are integrally formed that serve as cross-directional through holes corresponding to the pair of both-bracket fixing bosses of the front cabinet, enabling the both-bracket fixing bosses, the body-side bracket, and the support bracket to be screwed, by inserting screws in the pair of body-side lower screwing through holes and the pair of stand-side lower screwing through holes, both of which are aligned with the pair of both-bracket fixing bosses.

2. An LCD television comprising:
a body having a cabinet that is composed of a front cabinet with an LCD panel display window formed at its front, and a rear cabinet to be mounted on the rear of the front cabinet;
a body-side bracket mounted on the body; and a stand that supports the body via the body-side bracket by extending upward a support bracket to be fixed to the body-side bracket from underneath, wherein:

the support bracket is formed in a plate form;

on a bottom of the cabinet, a bracket insertion slot is formed through which the support bracket is inserted upward between the front cabinet and the rear cabinet;

the body-side bracket has: a plate-like main portion; a lower holding portion that causes both vertical edges of the support bracket to be inserted upward and retain the support bracket vertically slidably; an upper holding portion that causes an upper edge of the support bracket to be inserted upward and retain the support bracket; and a stopper portion to constrain upward movements of the support bracket inserted in the upper holding portion, the body-side bracket is mounted to the front cabinet above the bracket insertion slot, and is fixed by inserting the support bracket, which has been inserted in the bracket insertion slot from underneath, in the lower holding portion from underneath and sliding upward the support bracket to insert the same in the upper holding portion;

the lower holding portion comprises first and second lower holding portions; and the first and second lower holding portions have: lower holding bases extending from a surface of the main portion where the support bracket is fixed toward the support bracket; and adjacent direction extending portions that extend in directions adjacent to each other from each of ends of the extended lower holding bases and retain the support bracket vertically slidably by sandwiching each of vertical edges of the support bracket between the main portion and the lower holding portions.

3. The LCD television according to claim 2, wherein:

at an upper edge of the support bracket, a stopper hitting portion that hits against the stopper portion when slid upward and an upper insertion portion that extends above the stopper hitting portion and is inserted in the upper holding portion are formed;

on the body-side bracket, a bent extending portion is provided, having formed thereon: the upper holding portion that is bent from an upper edge of the main portion toward a surface where the support bracket is fixed and serves as a through hole through which an upper insertion portion of the support bracket is inserted upward; and the stopper portion to constrain upward movements of the support bracket inserted in the upper holding portion serving as the through hole by hitting the stopper hitting portion of the support bracket against the bottom.

4. The LCD television according to claim 3, wherein:

the upper insertion portion comprises first and second upper insertion portions respectively extending outward above the stopper hitting portion;

the upper holding portion serving as the through hole comprises first and second upper holding portions that causes the first and second upper insertion portions to be inserted upward and retain them vertically slidably; and the body-side bracket has a second bent extending portion that causes the first and second upper insertion portions, which have been inserted in the first and the second upper holding portions being bent and extended from an end of the bent extending portion extending from the main portion, to contact a surface opposite to a surface where the support bracket is fixed.

5. The LCD television according to claim 3, wherein:

the body has a metallic panel support plate that is mounted to the front cabinet in the cabinet having a pair of panel screwing through holes formed side by side, and supports the LCD panel;

the front cabinet has a pair of screwing bosses formed side by side and projecting from an inner surface of the front of the front cabinet backwardly, from below the panel support plate;

the body-side bracket has a pair of lower screwing through holes formed in alignment with the pair of screwing bosses of the front cabinet, and a pair of upper screwing through holes formed in alignment with a pair of panel screwing through holes of the panel support plate, the body-side bracket is fixed to the pair of screwing bosses of the front cabinet, and is fixed to the panel support plate with screws.

6. The LCD television according to claim 5, wherein:

the front cabinet has a pair of both-bracket fixing bosses that are formed side by side horizontally further on the inner side of the pair of screwing bosses for screwing the body-side bracket alone, and projecting backward from below an inner side of the panel support plate;

the body-side bracket has a pair of body-side lower screwing through holes formed in alignment with the pair of both-bracket fixing bosses of the front cabinet;

the support bracket has a pair of stand-side lower screwing through holes that are vertically-long ovals formed in alignment with the pair of both-bracket fixing bosses of the front cabinet; and the rear cabinet has a pair of both-bracket fixing holes that serve as cross-directional through holes aligned with the both-bracket fixing bosses of the front cabinet, that enable the both-brackets screwing bosses, the body-side bracket, and the support bracket to be screwed together, by inserting screws in the pair of both-bracket fixing bosses aligned with the pair of body-side lower screwing through holes and the pair of stand-side lower screwing through holes.

7. The LCD television according to claim 6, wherein:

the front cabinet and the rear cabinet are each integrally formed by injection molding;

the body-side bracket is integrally formed by press-forming a metal plate; and the support bracket is integrally formed by press-forming a metal plate.

8. The LCD television according to claim 7, wherein:

the support bracket is tiltable about a predetermined rotation axis at a lower edge; and the body is supported tiltably with respect to the stand about the predetermined rotation axis.

9. An LCD television comprising:

a body having a cabinet that is composed of a front cabinet having an LCD panel display window formed on its front, and a rear cabinet to be mounted at the rear of the front cabinet;

a body-side bracket mounted on the body; and a stand that supports the body from underneath via the body-side bracket by extending a support bracket upward to be fixed to the body-side bracket, wherein:

the support bracket is formed in a plate form;

at a bottom of the front cabinet, a bracket insertion slot is formed; and the body-side bracket has: a plate-like main portion; a lower holding portion that causes both vertical edges of the support bracket to be inserted upward and retains the support bracket vertically slidably; an upper holding portion that causes an upper edge of the support bracket to be inserted upward and retain the support bracket slidably; and a stopper portion to constrain upward movements of the support bracket inserted in the upper holding portion, the body-side bracket is mounted on the front cabinet above the bracket insertion slot and is fixed by inserting the support bracket, which has been inserted in the bracket insertion slot from underneath, in the lower holding portion from underneath, and sliding the support bracket upward into the upper holding portion;

the lower holding portion comprises first and second lower holding portions; and the first and second lower holding portions have: lower holding bases extending from a surface of the main portion where the support bracket is fixed toward the support bracket; and adjacent direction extending portions that extend in directions adjacent to each other from each of ends of the extended lower holding bases and retain the support bracket vertically slidably by sandwiching each of vertical edges of the support bracket between the main portion and the lower holding portions.

10. The LCD television according to claim 2, wherein the lower holding portion exists at a predetermined distance under the upper holding portion.

11. The LCD television according to claim 9, wherein the lower holding portion exists at a predetermined distance under the upper holding portion.

* * * * *